United States Patent
Takaoka et al.

(10) Patent No.: US 11,831,265 B2
(45) Date of Patent: Nov. 28, 2023

(54) MOTOR CONTROL DEVICE (71) Applicant: HITACHI ASTEMO, LTD., Hitachinaka (JP)

(72) Inventors: Midori Takaoka, Tokyo (JP); Takafumi Hara, Tokyo (JP); Shigehisa Aoyagi, Tokyo (JP); Hirokazu Matsui, Hitachinaka (JP); Shigeyuki Nonomura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 302 days.

(21) Appl. No.: 17/297,117

(22) PCT Filed: Nov. 14, 2019

(86) PCT No.: PCT/JP2019/044626
§ 371 (c)(1),
(2) Date: May 26, 2021

(87) PCT Pub. No.: WO2020/110740
PCT Pub. Date: Jun. 4, 2020

(65) Prior Publication Data
US 2022/0029573 A1 Jan. 27, 2022

(30) Foreign Application Priority Data

Nov. 28, 2018 (JP) .................................. 2018-222518

(51) Int. Cl.
*H02P 27/08* (2006.01)
*H02M 1/32* (2007.01)
(Continued)

(52) U.S. Cl.
CPC ............ *H02P 27/085* (2013.01); *B60L 13/03* (2013.01); *H02M 1/327* (2021.05); *H02M 7/53871* (2013.01); *B60L 2200/26* (2013.01)

(58) Field of Classification Search
CPC ................ H02P 27/085; H02P 29/032; H02M 7/53873; H02M 7/5395
See application file for complete search history.

(56) References Cited

U.S. PATENT DOCUMENTS

| | | | | |
|---|---|---|---|---|
| 2010/0164416 A1* | 7/2010 | Yamada | .................. | H02P 27/08 318/400.13 |
| 2014/0239861 A1* | 8/2014 | Ajima | ....................... | H02P 6/10 318/400.17 |

(Continued)

FOREIGN PATENT DOCUMENTS

| | | |
|---|---|---|
| JP | 2008-301656 A | 12/2008 |
| JP | 2009-207323 A | 9/2009 |

(Continued)

OTHER PUBLICATIONS

International Search Report with English translation and Written Opinion issued in corresponding application No. PCT/JP2019/044626 dated Feb. 25, 2020.

*Primary Examiner* — Rina I Duda
(74) *Attorney, Agent, or Firm* — Foley & Lardner LLP (57) ABSTRACT

A motor control device includes a PWM control unit, a carrier frequency setting unit, and a carrier frequency switching calculation unit. The PWM unite generates a signal to drive an inverter by pulse width modulation. The carrier frequency setting unit sets a carrier frequency used for pulse width modulation according to a number of rotations of a motor. The carrier frequency switching calculation unit calculates a frequency switching speed of the carrier frequency and is configured to perform a calculation method. The calculation method includes setting at least one of an emergency mode, a response priority mode, or a fluctuation suppression priority mode in response to various operating conditions.

9 Claims, 11 Drawing Sheets

(51) Int. Cl.
*B60L 13/03* (2006.01)
*H02M 7/5387* (2007.01)

(56) References Cited

U.S. PATENT DOCUMENTS

2015/0108929 A1    4/2015  Nobe et al.
2016/0211790 A1*   7/2016  Ajima .................... H02P 27/08

FOREIGN PATENT DOCUMENTS

JP    2011-097672 A    5/2011
JP    2015-080343 A    4/2015

* cited by examiner

MOTOR CONTROL DEVICE

TECHNICAL FIELD

The present invention relates to a motor control device.

BACKGROUND ART

A motor control device controls an inverter by PWM (Pulse Width Modulation) control to drive a motor. In PWM control, pulse width modulation is performed using a carrier wave and a modulated wave that is a voltage command, and a pulse voltage is applied to the motor. In PWM control, if the carrier frequency is set high, the efficiency of the motor can be improved and heat generation can be prevented in order to make it possible to reduce the harmonic loss generated in the motor. On the other hand, in the inverter, since the number of times the switching element is turned on/off increases, the inverter loss (switching loss) increases, which causes the inverter to generate heat. In addition, the circuit that supplies DC voltage to the inverter includes an LC circuit, and if the carrier frequency at which LC resonance occurs is set, it becomes a cause of overcurrent and overvoltage. Therefore, in the motor control device, PWM control is performed while switching the carrier frequency based on the motor operation information such as the number of rotations, torque command, and temperature information in order to thermally protect the inverter and the motor and avoid LC resonance.

In PWM control, when the carrier frequency is suddenly switched, the harmonic voltage included in the pulse voltage applied to the motor also suddenly changes, causing a torque fluctuation called a switching shock. When torque fluctuations occur, vibration and noise are generated in the motor, which causes failure of motor parts and makes motor control unstable. Therefore, in order to stably output torque in all the operation information of the motor, it is necessary to suppress the torque fluctuation that occurs when the carrier frequency is switched. Here, the carrier frequency and the response frequency of the motor control system are in a proportional relationship. For example, if the carrier frequency is set high, the upper limit of the response frequency that can be set by the motor control device becomes high. The lowering of the response frequency of the motor control device below the required value is called response deterioration. When the response deterioration occurs, vibration and noise may occur in the motor, and the desired operation cannot be realized. In general, since the carrier frequency and the number of rotations of the motor, and the carrier frequency and the upper limit of the response frequency are in a proportional relationship, the response frequency and the carrier frequency are preset with appropriate values according to the number of rotations of the motor. From these background technologies, it is necessary to have a technology for suppressing torque fluctuations that occur when the carrier frequency is switched while preventing the response deterioration of the motor control device.

PTL 1 describes that, when a set value of the carrier frequency is lowered from a set frequency to the upper limit frequency of LC resonance, the set value of the carrier frequency is changed to a first change frequency which is calculated based on the set value of the carrier frequency or the temperature of the switching element detected by a temperature sensor and a first predetermined temperature, and the output voltage setting value of a boost converter is changed to a voltage at which the upper limit frequency of LC resonance becomes a first change frequency. PTL 2 describes that the torque limit amount for preventing the temperature rise of the switching element is minimized to increase the inverter in power and decrease in size by improving a current-carrying capability.

CITATION LIST

Patent Literature

PTL 1: JP 2015-80343 A
PTL 2: JP 2011-97672 A

SUMMARY OF INVENTION

Technical Problem

The techniques described in PTL 1 and PTL 2 cannot prevent the response deterioration of the motor control device and suppress the torque fluctuation at the time of switching the carrier frequency, and are not able to stably drive the motor in a wide operating range.

Solution to Problem

A motor control device according to the invention includes a PWM control unit that generates a signal to drive an inverter by pulse width modulation, a carrier frequency setting unit that sets a carrier frequency used for pulse width modulation according to the number of rotations of the motor, and a carrier frequency switching calculation unit that calculates a frequency switching speed of the carrier frequency. The carrier frequency switching calculation unit switches a calculation method of the frequency switching speed based on a change rate of a torque command value to the motor.

Advantageous Effects of Invention

According to the invention, it is possible to suppress the torque fluctuation at the time of switching the carrier frequency while preventing the response deterioration of the motor control device, and it is possible to stably drive the motor in a wide operating range.

DESCRIPTION OF EMBODIMENTS

First Embodiment

The first embodiment will be described with reference to FIGS. 1 to 7.

Figure 1:
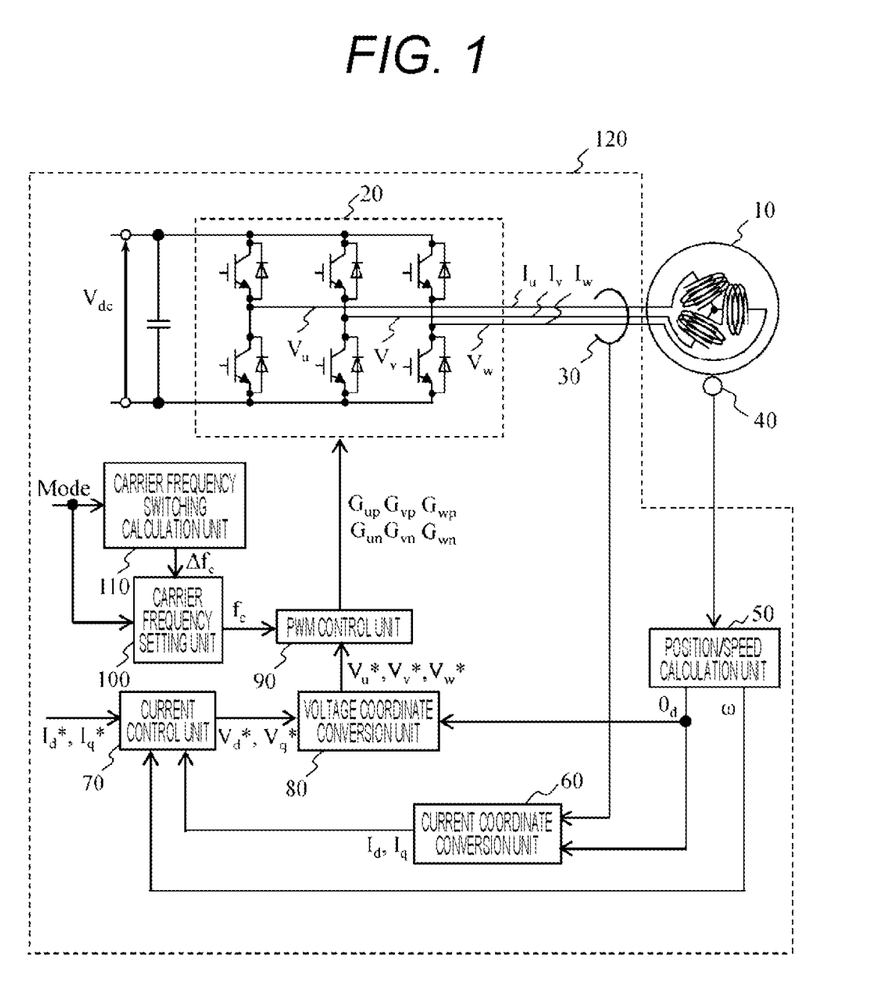
FIG. 1 is a configuration diagram of a motor control device.

FIG. 1 is a configuration diagram of a motor control device 120. The motor control device 120 controls the rotation of a motor 10. As illustrated in FIG. 1, the motor control device 120 includes a current sensor 30, a position/speed calculation unit 50, a current coordinate conversion unit 60, a current control unit 70, a voltage coordinate conversion unit 80, a PWM control unit 90, a carrier frequency setting unit 100, and a carrier frequency switching calculation unit 110.

A rotational position sensor 40 is attached to the motor 10. Here, as the rotational position sensor 40, a resolver composed of an iron core and a winding is more preferable, but a GMR sensor and a sensor using a Hall element can be used.

The position/speed calculation unit 50 outputs a rotor position θd and a rotation speed ω of the motor 10 based on a signal from the rotational position sensor 40. The current coordinate conversion unit 60 outputs dq-axis currents Id and Iq based on a three-phase alternating current (Iu, Iv, Iw) detected from the current sensor 30 and the rotor position θd.

The current control unit 70 outputs dq-axis voltage commands Vd* and Vq* using the rotation speed ω so that dq-axis current command values Id* and Iq* and the dq-axis current Id and Iq match. Here, in the current control unit 70, a response frequency ωACR is set so that the current command values Id* and Iq* follow the dq-axis currents Id and Iq at a desired speed.

When controlling the rotation speed ω of the motor 10 in the motor control device 120, the dq-axis current command values Id* and Iq* are created so as to match the rotation speed ω and the speed command ωr* from a host control device. When controlling an actual torque τm of the motor, the dq-axis current command values Id* and Iq* are created so as to be matched with a torque command value τ* from the host control device.

The voltage coordinate conversion unit 80 outputs three-phase voltage commands Vu*, Vv*, and Vw* based on the dq-axis voltage commands Vd* and Vq* and the rotor position ed.

The PWM control unit 90 performs pulse width modulation based on three-phase voltage commands Vu*, Vv*, and Vw* and the carrier frequency fc, generates gate signals Gun, Gup, Gvn, Gvp, Gwn, and Gwv for driving an inverter 20, and outputs the signals to the inverter 20.

The inverter 20 adjusts the frequencies and voltage effective values of the pulse voltages Vu, Vv, and Vw by controlling the switching element on or off based on the gate signals Gun, Gup, Gvn, Gvp, Gwn, and Gwv, and applies the pulse voltages Vu, Vv, and Vw to the motor 10.

The carrier frequency switching calculation unit 110 calculates and outputs a frequency switching speed Δfc of the carrier frequency fc based on the operation information Mode of the motor 10 such as the number of rotations N, the rotation speed ω, the torque command value τ*, a torque command value change rate Δτ*, and a temperature Tmp of the inverter 20. The carrier frequency setting unit 100 outputs the carrier frequency fc based on the operation information Mode of the motor 10 and the frequency switching speed Δfc of the carrier frequency fc. The frequency switching speed Δfc corresponds to the rate of change per hour when the carrier frequency fc is changed, and the larger (faster) the value of the frequency switching speed Δfc, the larger the carrier frequency fc changes in a short time.

Figure 2:
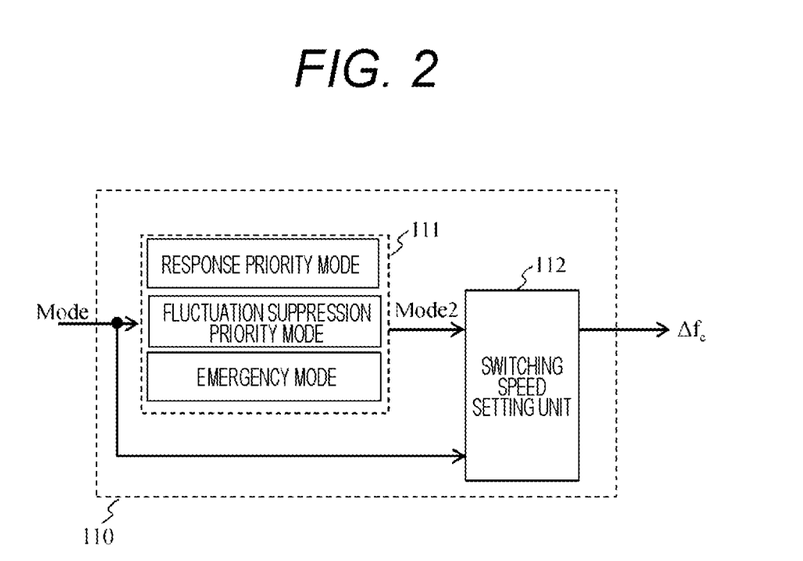
FIG. 2 is a block configuration diagram of a carrier frequency switching calculation unit.

FIG. 2 is a block configuration diagram of the carrier frequency switching calculation unit 110. The carrier frequency switching calculation unit 110 includes a switching mode selection unit 111 and a switching speed setting unit 112. The switching mode selection unit 111 selects one of a response priority mode, a fluctuation suppression priority mode, and an emergency mode based on the operation information mode of the motor, and outputs a switching mode Mode2. Details of each mode will be described later. The switching speed setting unit 112 outputs the frequency switching speed Δfc of the carrier frequency fc based on the switching mode Mode2 and the operation information Mode of the motor.

Next, the relationship between the PWM control and the carrier frequency fc will be described.

In the PWM control, the pulse voltages Vu, Vv, and Vw are output by comparing the amplitudes of the carrier wave and modulated waves Vu*, Vv*, and Vw*, which are voltage commands, based on the carrier frequency fc. If the carrier frequency fc is set high, the harmonic loss generated in the motor 10 can be reduced, and the efficiency of the motor 10 can be improved and heat generation can be prevented. On the other hand, since the number of ON/OFF times of the switching element of the inverter 20 increases, the inverter loss (switching loss) increases, which causes heat generation of the inverter 20. Further, since the circuit that supplies the DC voltage to the inverter 20 includes an LC circuit, there is a carrier frequency fc that causes LC resonance. If the carrier frequency fc that causes LC resonance is set, it causes overcurrent and overvoltage of the motor 10. Therefore, in order to thermally protect the inverter 20 and the motor 10 and avoid LC resonance, it is necessary to perform the PWM control while switching the carrier frequency fc based on the operation information Mode of the motor 10 such as number of rotations N, torque command value τ*, and temperature information.

Next, the problems when switching the carrier frequency fc will be described.

Figure 3:
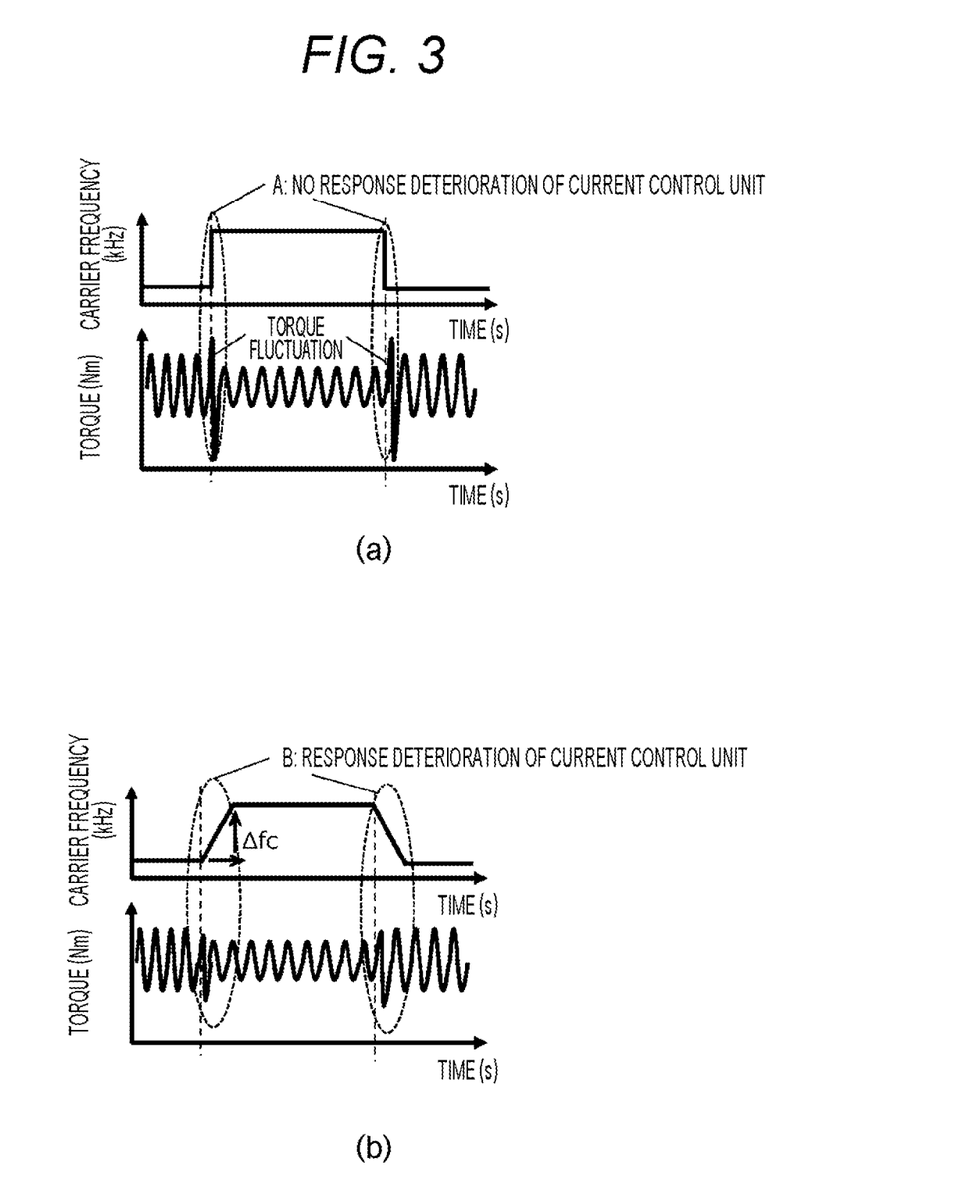
FIGS. 3(a) and 3(b) are diagrams for explaining torque fluctuations when switching carrier frequencies.

FIG. 3 is a diagram for explaining the torque fluctuation when the carrier frequency fc is switched. FIG. 3(a) illustrates a case where the carrier frequency fc is suddenly switched, and FIG. 3(b) illustrates a case where the carrier frequency fc is switched at a predetermined frequency switching speed. In each drawing, the upper part illustrates the time change of the carrier frequency fc, and the lower part illustrates the time change of torque.

When the carrier frequency fc is suddenly switched, as illustrated in part A of FIG. 3(a), there is no deterioration in the response of the current control unit 70, but torque fluctuation called a switching shock occurs. This torque fluctuation causes vibration and noise of the motor 10, causes a failure of parts, and makes the motor control unstable, so it is necessary to suppress it. Further, when the carrier frequency fc is suddenly switched, the harmonic components contained in the pulse voltages Vu, Vv, and Vw applied to the motor 10 suddenly change, resulting in voltage disturbance, which is one of the factors of torque fluctuation.

On the other hand, as illustrated in FIG. 3(b), when the carrier frequency fc is switched at a predetermined frequency switching speed Δfc, the harmonic components contained in the pulse voltages Vu, Vv, and Vw applied to the motor 10 change slowly. Therefore, the torque fluctuation can be suppressed as illustrated in part B of FIG. 3(b). However, since the carrier frequency fc and the upper limit of the response frequency ωACR that can be set are in a proportional relationship, if the frequency switching speed Δfc of the carrier frequency fc is set too slow, the carrier frequency fc changes too slowly. As illustrated in part B of FIG. 3(b), it causes deterioration of the response of the current control unit 70 at the transition time of the carrier frequency fc. When the response deteriorates, vibration and noise of the motor 10 are generated, and the desired operation cannot be achieved. Here, the response frequency ωACR and the carrier frequency fc are set according to the number of rotations N of the motor 10. Therefore, it is necessary to suppress the response deterioration of the current control unit 70 and suppress the torque fluctuation at the time of switching the carrier frequency fc.

Next, the setting of the frequency switching speed Δfc of the carrier frequency fc in this embodiment will be described.

Figure 4:
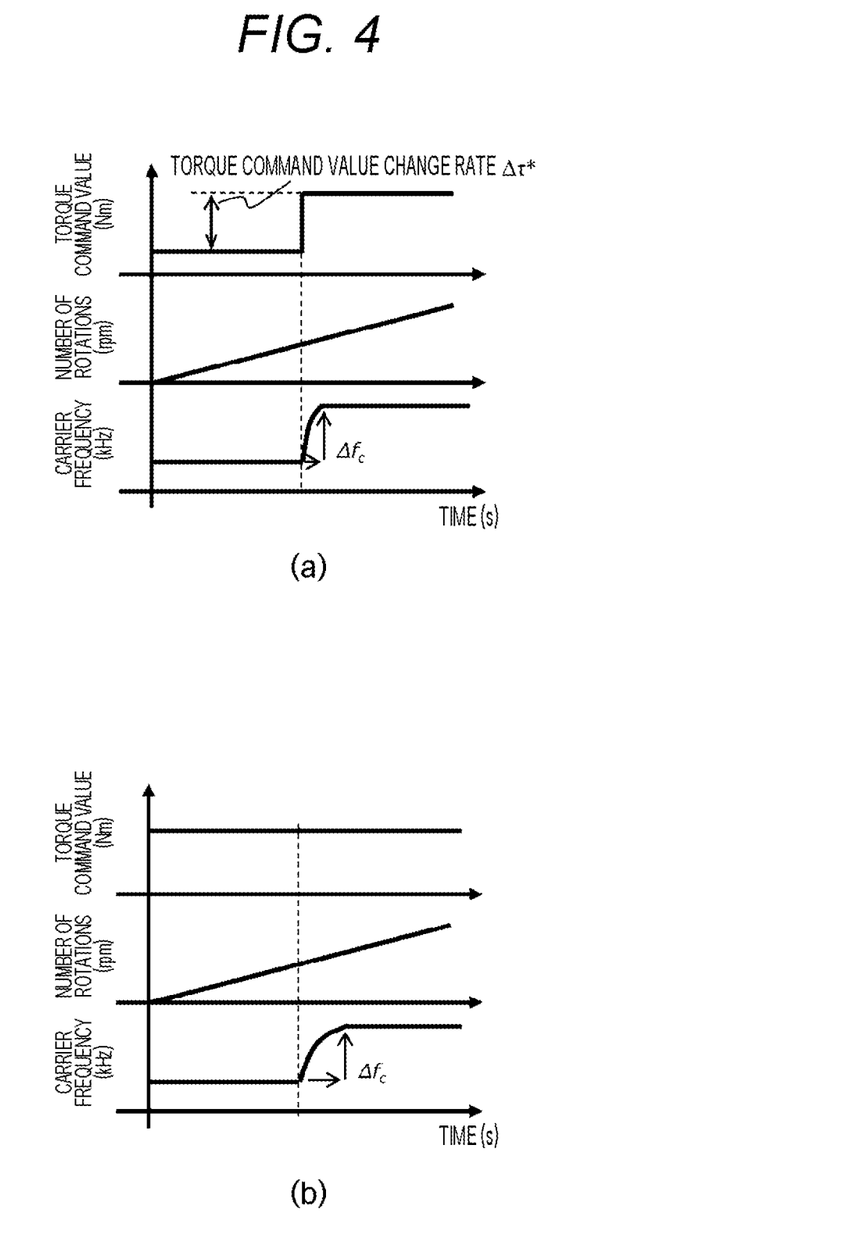
FIGS. 4(a) and 4(b) are diagrams for explaining a switching mode of the carrier frequency.

FIG. 4 is a diagram for explaining a switching mode of the carrier frequency fc. FIG. 4(a) illustrates the response priority mode, and FIG. 4(b) illustrates the fluctuation suppression priority mode. In each drawing, the upper part illustrates the time change of the torque command value τ*, and the middle part illustrates the time change of the number of rotations N, and the lower part illustrates the time change of the carrier frequency fc.

As illustrated in the upper part of FIG. 4(a), in a case where the carrier frequency fc is switched when the torque command value change rate Δτ* is equal to or higher than a predetermined value, and the frequency switching speed Δfc of the carrier frequency fc is set too slow as illustrated in the lower part of FIG. 4(a), the response of the current control unit 70 at the transition time of the carrier frequency fc deteriorates. Therefore, it takes more time than the required value for the actual torque τm to follow the torque command value τ*. To prevent this, it is necessary to set a response frequency ωfc of the frequency switching speed Δfc of the carrier frequency fc to be equal to or faster than the response frequency ωACR of the current control unit 70. That is, it is necessary to set the response priority mode in which ωfc≥ωACR. With this setting, it is possible to minimize the response deterioration and torque fluctuation of the current control unit 70 when the carrier frequency fc is switched.

As illustrated in the upper part of FIG. 4(b), when the torque command value change rate Δτ* is equal to or less than a predetermined value, even if the carrier frequency fc is gradually changed as illustrated in the lower part of FIG. 4(b), the change in the torque command value τ* is small. Therefore, the actual torque τm already follows the torque command value τ*, and the influence of response deterioration is small. In this case, the frequency switching speed Δfc of the carrier frequency fc can be set slower in order to further suppress the torque fluctuation. That is, it is necessary to set the fluctuation suppression priority mode. In this case, ωfc<ωACR may be satisfied.

Further, when switching the carrier frequency fc, it is necessary to switch the carrier frequency fc promptly even if the occurrence of the torque fluctuation is accepted when the set carrier frequency fc overlaps with the LC resonance band, or when an inverter temperature Tmp is equal to or more than a predetermined value. In this case, the frequency switching speed Δfc of the carrier frequency fc is set so that the carrier frequency fc can be switched stepwise, in other words, abruptly.

Figure 5:
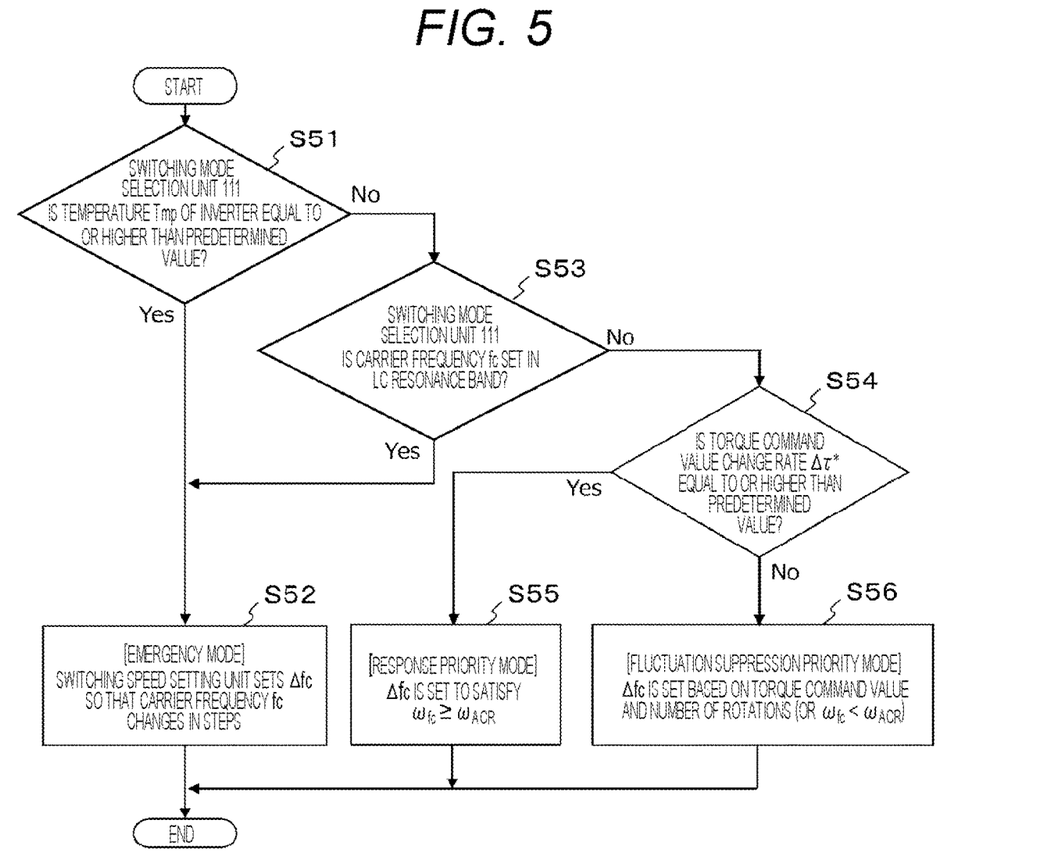
FIG. 5 is a flowchart illustrating an operation of the carrier frequency switching calculation unit.

FIG. 5 is a flowchart illustrating the operation of the carrier frequency switching calculation unit 110. The program illustrated in this flowchart can be executed by a computer equipped with a CPU, memory, and the like. The whole process or a part of the process may be realized by a hardware logic circuit. Further, this program can be stored in a storage medium of the motor control device 120 in advance and provided. Alternatively, the program may be stored and provided in an independent recording medium, or the program may be recorded and stored in the storage medium of the motor control device 120 through a network line. It may be provided as various forms of computer-readable computer program products such as data signals (carrier waves).

Hereinafter, the setting of the frequency change rate Δfc of the carrier frequency fc by the carrier frequency switching calculation unit 110 will be described with reference to FIG. 5.

In Step S51 of FIG. 5, the switching mode selection unit 111 determines whether the temperature Tmp of the inverter 20, which is one of the parameters of the operation information Mode of the motor 10, is equal to or higher than a predetermined value, that is, is in an overheated state. When it is determined that the temperature Tmp of the inverter 20 is equal to or higher than a predetermined value, the switching mode selection unit 111 selects the emergency mode and proceeds to Step S52.

In Step S52, the switching speed setting unit 112 sets and outputs the frequency switching speed Δfc of the carrier frequency fc so that the carrier frequency fc changes in steps. In response to this, the carrier frequency setting unit 100 outputs the carrier frequency fc in steps based on the operation information Mode of the motor 10 and the frequency switching speed Δfc of the carrier frequency fc. That is, the frequency switching speed Δfc is set to the fastest value. Summarizing Steps S51 to S52, when the temperature of the inverter 20 is equal to or higher than a predetermined value, the frequency switching speed Δfc of the carrier frequency fc is set to the fastest value.

If it is determined in Step S51 that the temperature Tmp of the inverter 20 is less than a predetermined value, the process proceeds to Step S53. In Step S53, it is determined whether the carrier frequency fc is set to a prohibited band such as LC resonance. If the carrier frequency fc corresponds to a prohibited band such as LC resonance, the switching mode selection unit 111 selects the emergency mode and proceeds to Step S52. Summarizing Steps S53 and S52, it is determined whether the carrier frequency fc is in the LC resonance band, and if the carrier frequency fc is in the LC resonance band, the frequency switching speed of the carrier frequency fc is set to the fastest value.

If it is determined in Step S53 that the carrier frequency fc is not set in the prohibited band such as LC resonance, the process proceeds to Step S54. In Step S54, it is determined whether the torque command value change rate Δτ*, which is one of the parameters of the operation information Mode of the motor 10, is equal to or greater than a predetermined value.

If the torque command value change rate Δτ* is equal to or greater than a predetermined value, the switching mode selection unit 111 selects the response priority mode, and the process proceeds to Step S55.

In Step S55, the switching speed setting unit 112 acquires the response frequency ωACR of the current control unit 70 from information such as the number of rotations N of the operation information Mode of the motor 10, and the frequency switching speed Δfc of the carrier frequency fc is set fast so as to satisfy the relationship that the response frequency ωfc of the frequency switching speed Δfc is ωfc≥ωACR. Summarizing Steps S54 to S55, when the change rate Δτ* of the torque command value to the motor 10 is equal to or greater than a predetermined value, the frequency switching speed Δfc of the carrier frequency fc is set based on the number of rotations N of the motor 10 so that the response frequency ωfc of the frequency switching speed Δfc of the carrier frequency fc becomes faster than the response frequency ωACR of the current control unit 70.

If it is determined in Step S54 that the torque command value change rate Δτ* is less than a predetermined value, the switching mode selection unit 111 selects the fluctuation suppression priority mode, and the process proceeds to Step S56.

In Step S56, the switching speed setting unit 112 sets the frequency switching speed Δfc of the carrier frequency fc not to be fast so that the torque fluctuation generated in the current operation can be suppressed from the information such as the torque command value τ* of the operation information Mode of the motor 10 and the number of rotations N. In this fluctuation suppression priority mode, the relationship may be ωfc<ωACR. Summarizing Steps S54 and S56, when the change rate Δτ* of the torque command value to the motor 10 is less than a predetermined value, the frequency switching speed Δfc of the carrier frequency fc is set based on the torque command value τ* to the motor 10 and the number of rotations N of the motor 10 regardless of the response frequency ωACR of the current control unit 70.

The frequency switching speed Δfc of the carrier frequency fc may be stored in a look-up table or the like in advance and set based on this. Further, the frequency switching speed Δfc of the carrier frequency fc may be set based on a mathematical expression of the relationship between the torque command value τ* and the number of rotations N and the torque fluctuation according to the motor 10 to be adopted.

Figure 6:
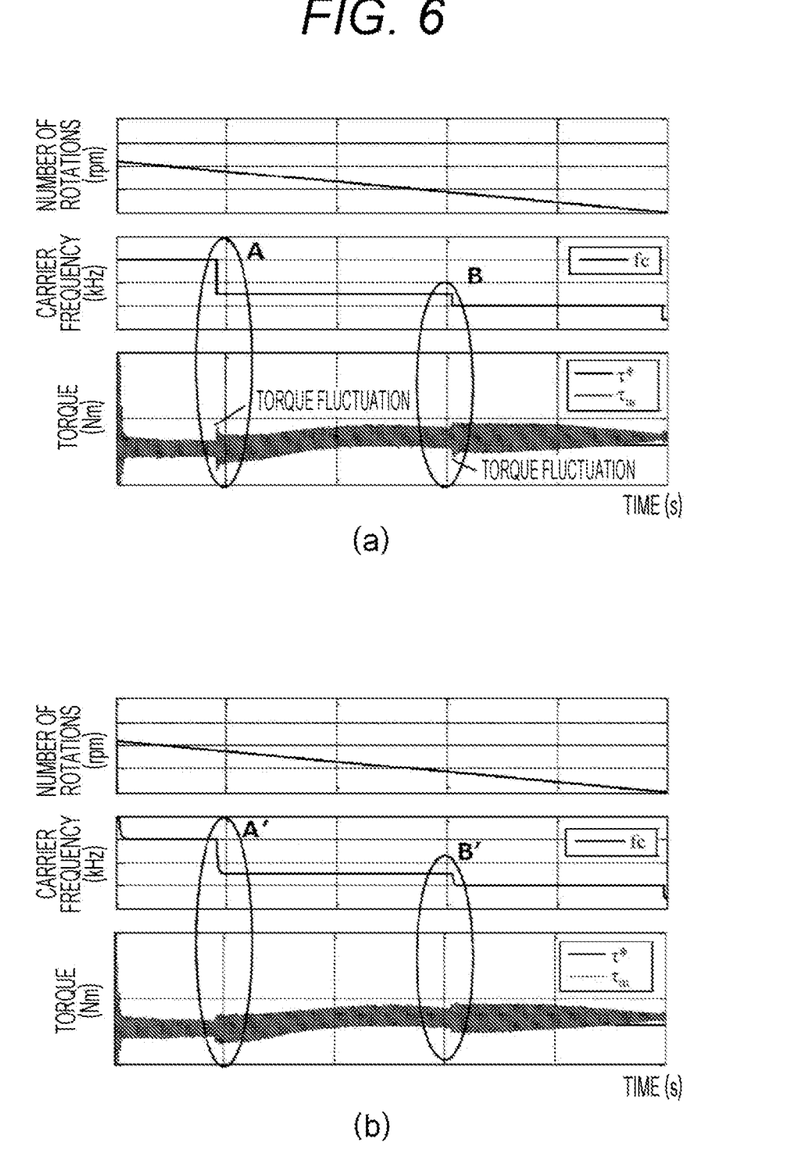
FIGS. 6(a) and 6(b) are diagrams for explaining torque fluctuations when switching carrier frequencies.

FIG. 6 is a diagram for explaining the torque fluctuation. FIG. 6(a) illustrates a conventional case in which the frequency switching speed Δfc is not set, and FIG. 6(b) illustrates a case of this embodiment in which the frequency switching speed Δfc is set. In each drawing, the upper part illustrates the time change of the number of rotations N, the middle part illustrates the time change of the carrier frequency fc, and the lower part illustrates the time change of the actual torque τm.

As illustrated in FIG. 6(a), when the frequency switching speed Δfc is not set, the torque fluctuations illustrated in parts A and B occur when the carrier frequency fc is switched. On the other hand, in the case of this embodiment in which the frequency switching speed Δfc illustrated in FIG. 6(b) is set, the torque fluctuation can be suppressed as illustrated in parts A' and B' when the carrier frequency fc is switched.

Figure 7:
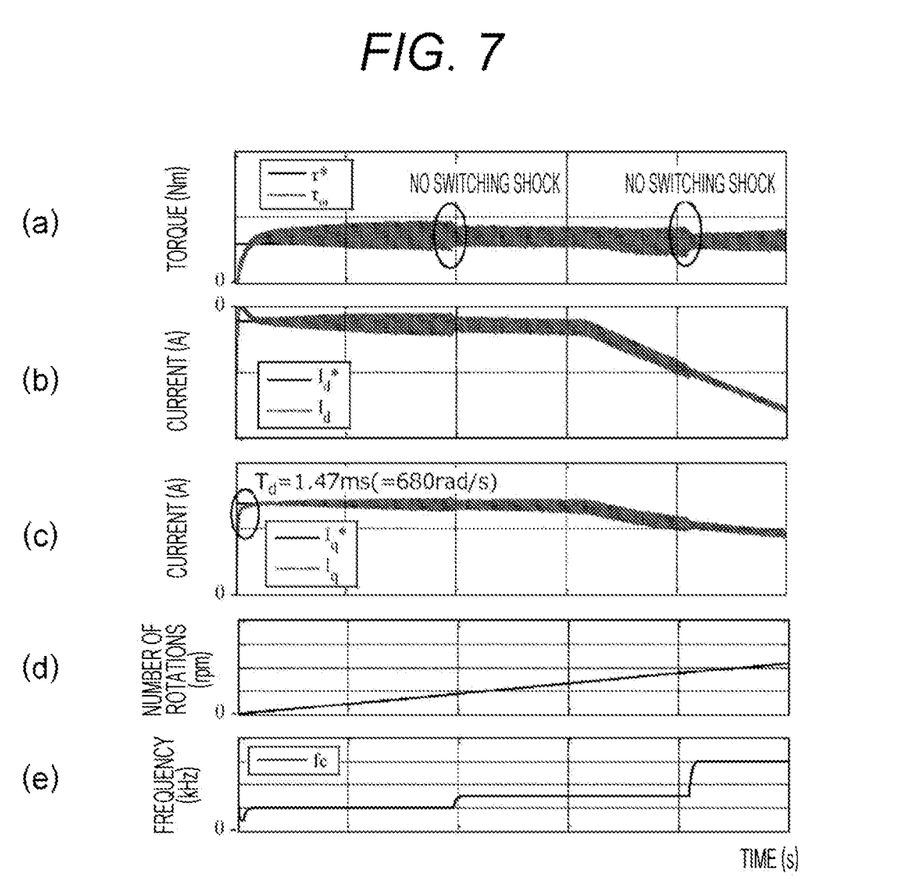
FIGS. 7(a) to 7(e) are diagrams illustrating a current response in a first embodiment.
Figure 8:
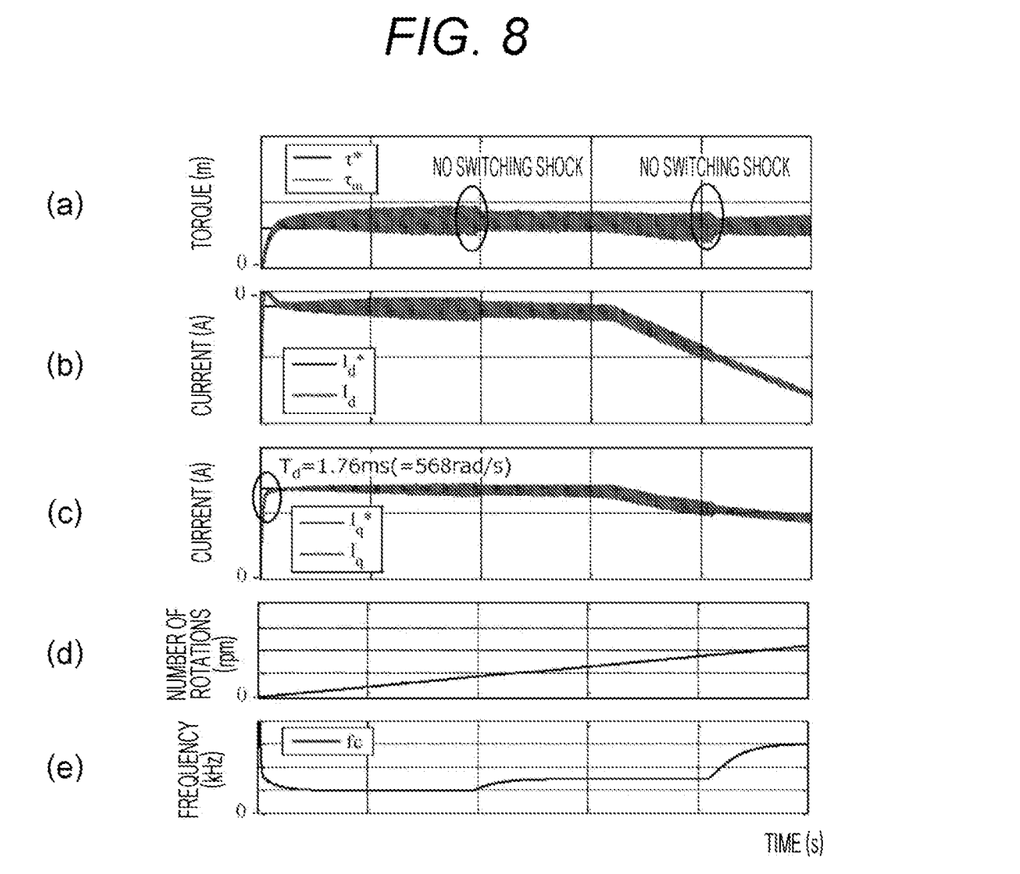
FIGS. 8(a) to 8(e) are diagrams illustrating the current response in the first embodiment.

FIGS. 7 and 8 are diagrams illustrating the current response in this embodiment. FIG. 7 illustrates a case where the frequency switching speed Δfc is set to ωACR≤ωfc, and FIG. 8 illustrates a case where the frequency switching speed Δfc is set to ωACR>ωfc.

FIG. 7(a) illustrates the change in the actual torque τm with respect to the torque command value τ*, FIG. 7(b) illustrates the current response of the d-axis current Id with respect to a d-axis current command value Id*, and FIG. 7(c) illustrates the current response of the q-axis current Iq with respect to a q-axis current command value Iq*, FIG. 7(d) illustrates the time change of the number of rotations N, and FIG. 7(e) illustrates the time change of the carrier frequency fc.

A case where the frequency switching speed Δfc according to this embodiment is set to ωACR≤ωfc, that is, a case where the response priority mode is set will be described. When the carrier frequency fc is changed as illustrated in FIG. 7(e), the switching shock of the actual torque τm does not occur as illustrated in FIG. 7(a). Further, as illustrated in FIG. 7(c), a current response Td of the q-axis current Iq is 680 rad/s, which satisfies the required value of 650 rad/s of the current response frequency ωACR. That is, when the frequency switching speed Δfc is set to ωACR≤ωfc, it can be confirmed that the torque fluctuation can be suppressed while satisfying the required value of the current response frequency ωACR.

Next, a case where the frequency switching speed Δfc according to this embodiment is set to ωACR>ωfc, that is, a case where the fluctuation suppression priority mode is set will be described. FIG. 8(a) illustrates the change in the actual torque τm with respect to the torque command value τ*, FIG. 8(b) illustrates the current response of the d-axis current Id with respect to the d-axis current command value Id*, and FIG. 8(c) illustrates the current response of the q-axis current Iq with respect to the q-axis current command value Iq*, FIG. 8(d) illustrates the time change of the number of rotations N, and FIG. 8(e) illustrates the time change of the carrier frequency fc.

As illustrated in FIG. 8(e), the carrier frequency fc is gradually changed in the fluctuation suppression priority mode. As a result, as illustrated in FIG. 8(a), the switching shock of the actual torque τm does not occur. As illustrated in FIG. 8(c), the current response Td of the q-axis current Iq is 568 rad/s, which is lower than the required value of 650 rad/s for the current response frequency ωACR, but the actual torque τm already follows the torque command value τ* as illustrated in FIG. 8(a). Therefore, as described above, the influence of response deterioration is small, and no particular problem occurs in the control of the motor 10.

When switching the carrier frequency fc, the frequency switching speed Δfc of the carrier frequency fc may have a hysteresis characteristic in order to prevent chattering (variation between the frequency before the carrier frequency fc is switched and the frequency after the switching) at the time of switching the carrier frequency fc. The operation information Mode of the motor 10 required to set the frequency switching speed Δfc of the carrier frequency fc uses the carrier frequency fc, the number of rotations N, the torque command value τ*, the torque command value change rate Δτ*, and the inverter temperature Tmp. However, if the same effect as that of this embodiment can be obtained, other parameters such as d-axis current Id and q-axis current Iq may be used.

Second Embodiment

The second embodiment is an example in which the motor control device 120 described in the first embodiment is applied to an electric power steering device 200.

Figure 9:
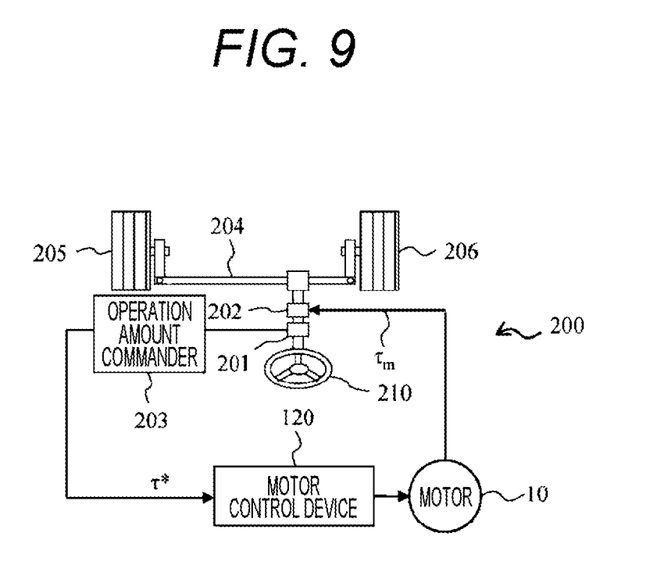
FIG. 9 is a configuration diagram of an electric power steering device according to a second embodiment.

FIG. 9 is a configuration diagram of the electric power steering device 200 according to this embodiment. As illustrated in FIG. 9, the electric power steering device 200 is equipped with the motor control device 120 and uses the motor 10 as a drive source. The torque command value τ* to the motor 10 is created by an operation amount commander 203 as a steering assist amount of a steering wheel 210. A steering angle and a steering torque are detected by a steering detector 201, and the torque command value τ* is calculated by an operation amount commander 203 in consideration of the state quantities such as the vehicle speed and the road surface condition. The motor control device 120 receives the torque command value τ* as an input command, and controls the actual torque τm of the motor 10 to follow the torque command value τ*.

The actual torque τm of the motor 10 output from the output shaft directly connected to the rotor of the motor 10 transmits torque to a rack 204 via a reduction mechanism such as a worm, a wheel or a planetary gear, or a torque transmission mechanism 202 using a hydraulic mechanism. The torque transmitted to the rack 204 reduces the steering force of the driver's steering wheel 210 by electric force, and the steering angles of wheels 205 and 206 are operated.

By applying the motor control device 120 described in the first embodiment, the torque of the electric power steering device 200 can be stably output.

Third Embodiment

The third embodiment is an example in which the motor control device 120 described in the first embodiment is applied to an electric vehicle 300.

Figure 10:
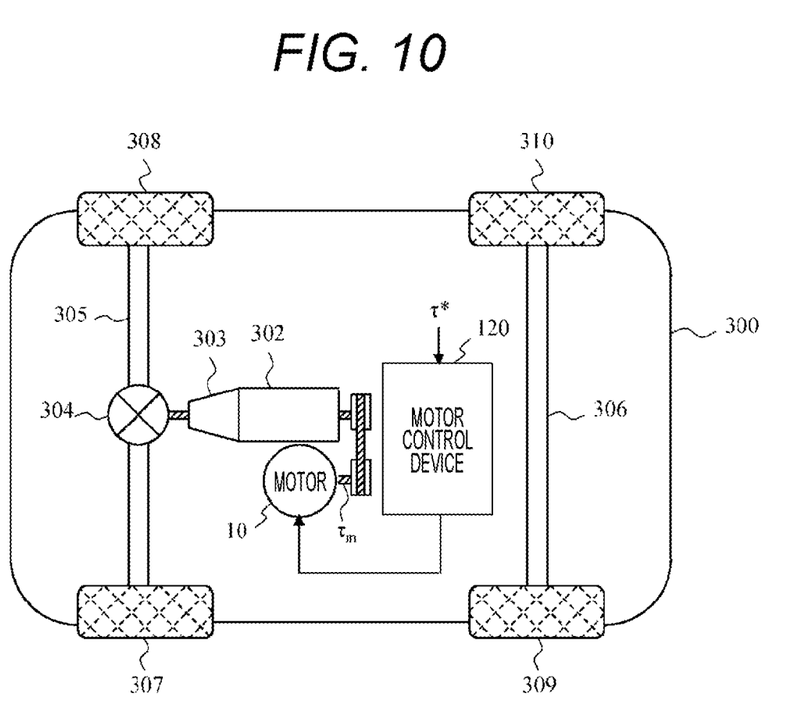
FIG. 10 is a configuration diagram of an electric vehicle according to a third embodiment.

FIG. 10 is a configuration diagram of the electric vehicle 300 according to this embodiment. As illustrated in FIG. 10, in the electric vehicle 300, a front wheel axle 305 is pivotally supported at the front portion, and front wheels 307 and 308 are provided at both ends thereof. A rear wheel axle 306 is pivotally supported at the rear portion of the electric vehicle 300, and rear wheels 309 and 310 are provided at both ends thereof. The front wheel axle 305 is provided with a differential gear 304, which is a power distribution mechanism, and transmits rotational power transmitted from an engine 302 via a transmission 303 to the front wheel axle 305. The engine 302 and the motor 10 are mechanically connected, and the rotational power of the motor 10 is transmitted to the engine 302, and the rotational power of the engine 302 is transmitted to the motor 10.

The motor 10 is driven and controlled by the motor control device 120 described in the first embodiment, receives a torque command value τ* as an input command from the host system, and is controlled such that the actual torque τm of the motor 10 follows the torque command value τ*. That is, while the motor 10 is controlled by the motor control device 120 and operates as an electric motor, the motor 10 also operates as a generator that generates three-phase AC power by rotating the rotor in response to the rotational driving force of the engine 302.

By applying the motor control device 120 described in the first embodiment, it is possible to obtain a stable torque output of the electric vehicle 300 in the entire operating range.

In this embodiment, a hybrid vehicle has been described as an example, but the same effect can be obtained in the case of a plug-in hybrid vehicle, an electric vehicle, or the like. Further, one or more motors 10 may be mounted.

Fourth Embodiment

The fourth embodiment is an example in which the motor control device 120 described in the first embodiment is applied to a railway vehicle 400.

Figure 11:
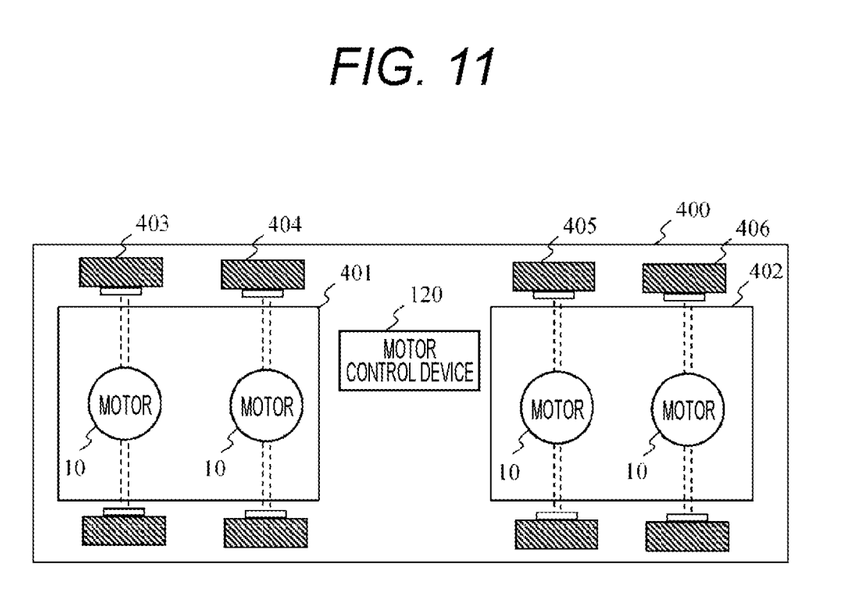
FIG. 11 is a configuration diagram of a railway vehicle according to a fourth embodiment.

FIG. 11 is a configuration diagram of the railway vehicle 400 according to this embodiment. As illustrated in FIG. 11, the railway vehicle 400 is equipped with bogies 401 and 402, and the bogies 401 and 402 are equipped with the motor 10, wheels 403, 404, 405, and 406. The motor 10 is driven and controlled by the motor control device 120 described in the first embodiment, receives a torque command value τ* as an input command from the host system, and is controlled such that the actual torque τm of the motor 10 follows the torque command value τ*.

By applying the motor control device 120 described in the first embodiment, it is possible to obtain a stable torque output of the railway vehicle 400 in the entire operating range.

According to the above embodiment, the following operational effects are obtained.

(1) The motor control device 120 includes the PWM control unit 90 that generates gate signals Gun, Gup, Gvn, Gvp, Gwn, and Gwv for driving the inverter 20 by pulse width modulation, the carrier frequency setting unit 100 that sets the carrier frequency fc which is used by the PWM control unit 90 for the pulse width modulation according to the number of rotations N of the motor 10, and the carrier frequency switching calculation unit 110 which calculates the frequency switching speed Δfc of the carrier frequency fc. The carrier frequency switching calculation unit 110 switches a calculation method of the frequency switching speed Δfc based on the change rate Δτ* of the torque command value τ* to the motor 10. As a result, the torque fluctuation at the time of switching the carrier frequency fc can be suppressed while preventing the response deterioration of the motor control device, and the motor can be stably driven in a wide operating range.

The invention is not limited to the above embodiments, and includes other forms considered within the scope of the technical ideas of the invention as long as the features of the invention are not degraded. In addition, the above embodiments and the modifications may be combined.

REFERENCE SIGNS LIST 10 motor
20 inverter
30 current sensor
40 rotational position sensor
50 position/speed calculation unit
60 current coordinate conversion unit
70 current control unit
80 voltage coordinate conversion unit
90 PWM control unit
100 carrier frequency setting unit
110 carrier frequency switching calculation unit
111 switching mode selection unit
112 switching speed setting unit
120 motor control device
200 electric power steering device
210 steering wheel
201 steering detector
202 torque transmission mechanism
203 operation amount commander
204 rack
205,206 wheel
300 electric vehicle
302 engine
303 transmission
304 differential gear
305 front wheel axle
306 rear wheel axle
307,308 front wheel
309,310 rear wheel
400 railway vehicle 401,402 bogie
403,404,405,406 wheel
Id*,Iq* dq-axis current command value
Id,Iq dq-axis current
Iu,Iv,Iw three-phase alternating current
Vd*,Vq* dq-axis voltage command
Vd,Vq dq-axis voltage
Vu*,Vv*,Vw* three-phase voltage command
θd rotor position
ωr rotation speed
ωr* speed command
τm actual torque
Δτ* torque command value change rate
τ* torque command value
Gun,Gup,Gvn,Gvp,Gwn,Gwv gate signal
Vu,Vv,Vw pulse voltage
Mode operation information
Mode2 switching mode
Fc carrier frequency
Δfc frequency switching speed
ωACR response frequency of current control unit
ωfc response frequency when switching carrier frequency

The invention claimed is:

1. A motor control device, comprising:
a PWM control unit that generates a signal to drive an inverter by pulse width modulation;
a carrier frequency setting unit that sets a carrier frequency used for pulse width modulation according to a number of rotations of a motor; and
a carrier frequency switching calculation unit that calculates a frequency switching speed of the carrier frequency, the carrier frequency switching calculation unit is configured to
determine whether a temperature of the inverter is greater than a predetermined temperature, and (i) in response to determining the temperature is greater than the predetermined temperature, set a mode to an emergency mode, and (ii) in response to determining the temperature is not greater than the predetermined temperature, determine whether the carrier frequency is in an LC resonance band,
in response to determining the carrier frequency is in the LC resonance band, set the mode to the emergency mode,
in response to determining the carrier frequency is not in the LC resonance band, determine whether a change rate of a torque command is greater than or equal to a predetermined value,
in response to the change rate being greater than or equal to the predetermined value, set the mode to a response priority mode,
in response to the change rate being less than the predetermined value, set the mode to a fluctuation suppression priority mode, and
operate the motor based on the set mode.

2. The motor control device according to claim 1, further comprising:
a current control unit that calculates a voltage command based on a current command value,
wherein the PWM control unit performs the pulse width modulation based on the voltage command, and
wherein, when the change rate of the torque command value to the motor is equal to or greater than the predetermined value and the response priority mode is set, the carrier frequency switching calculation unit sets the frequency switching speed based on the number of rotations of the motor such that a response frequency of the frequency switching speed is faster than a response frequency of the current control unit.

3. The motor control device according to claim 1,
wherein when the change rate of the torque command value to the motor is less than the predetermined value and the fluctuation suppression priority mode is set, the carrier frequency switching calculation unit sets the frequency switching speed based on the torque command value and the number of rotations of the motor.

4. The motor control device according to claim 3, further comprising:
a current control unit that calculates a voltage command based on a current command value,
wherein the PWM control unit performs the pulse width modulation based on the voltage command, and
wherein the carrier frequency switching calculation unit sets the frequency switching speed regardless of a response frequency of the current control unit.

5. The motor control device according to claim 1,
wherein when the temperature of the inverter is equal to or higher than a predetermined value and the emergency mode is set, the carrier frequency switching calculation unit sets the frequency switching speed to a fastest value.

6. The motor control device according to claim 1,
wherein the carrier frequency is in in an LC resonance band and the emergency mode is set, the frequency switching speed is set to a fastest value.

7. The motor control device according to claim 1,
wherein an operating force of electric power steering is assisted with the motor, and the motor is driven based on the torque command value.

8. The motor control device according to claim 1,
wherein the motor is a drive source for an electric vehicle, and the motor is driven based on the torque command value.

9. The motor control device according to claim 1,
wherein the motor is as a drive source for a railway vehicle, and the motor is driven based on the torque command value.

* * * * *